US010754623B2

(12) United States Patent
Moody et al.

(10) Patent No.: US 10,754,623 B2
(45) Date of Patent: Aug. 25, 2020

(54) BUILDING MANAGEMENT SYSTEM WITH GRAPHICAL PROGRAMMING TOOL

(71) Applicant: Johnson Controls Technology Company, Auburn Hills, MI (US)

(72) Inventors: Peter W. Moody, Simi Valley, CA (US); Neil E. Hickox, Simi Valley, CA (US); Canh T. Nguyen, El Monte, CA (US); Richard A. Horvet, II, Newbury Park, CA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 105 days.

(21) Appl. No.: 15/960,942

(22) Filed: Apr. 24, 2018

(65) Prior Publication Data
US 2018/0314496 A1  Nov. 1, 2018

Related U.S. Application Data

(60) Provisional application No. 62/490,374, filed on Apr. 26, 2017.

(51) Int. Cl.
| | |
|---|---|
| *G05B 19/042* | (2006.01) |
| *G06F 9/451* | (2018.01) |
| *G06F 8/20* | (2018.01) |
| *G06F 8/34* | (2018.01) |
| *G06F 8/35* | (2018.01) |

(52) U.S. Cl.
CPC ........... *G06F 8/24* (2013.01); *G05B 19/0426* (2013.01); *G06F 8/34* (2013.01); *G06F 8/35* (2013.01); *G06F 9/451* (2018.02); *G05B 2219/2642* (2013.01)

(58) Field of Classification Search
None
See application file for complete search history.

(56) References Cited

U.S. PATENT DOCUMENTS

| | | | | |
|---|---|---|---|---|
| 9,817,383 | B1* | 11/2017 | Sinha | G05B 13/0205 |
| 2010/0070089 | A1* | 3/2010 | Harrod | G05B 19/042 |
| | | | | 700/277 |
| 2011/0071685 | A1* | 3/2011 | Huneycutt | G05B 15/02 |
| | | | | 700/275 |
| 2011/0087650 | A1* | 4/2011 | Mackay | G05B 15/02 |
| | | | | 707/722 |
| 2011/0137853 | A1* | 6/2011 | Mackay | G06Q 10/06 |
| | | | | 706/57 |
| 2013/0238830 | A1* | 9/2013 | Pouchak | H04L 12/2803 |
| | | | | 710/305 |
| 2017/0300193 | A1* | 10/2017 | Ray | G06F 3/0482 |
| 2017/0322534 | A1* | 11/2017 | Sinha | G05B 19/0426 |

(Continued)

*Primary Examiner* — Isaac T Tecklu
(74) *Attorney, Agent, or Firm* — Foley & Lardner LLP

(57) ABSTRACT

A building management system includes a programming tool and a target device. The graphical tool includes a user interface generator configured to provide a user interface that allows a user to create a block design comprising a plurality of logical, mathematical, and functional object. The target device includes a block generator configured to receive a text file of the block design, convert the text file into an application block file, and assemble the application block file into a custom application for the target device. The target device further includes a device controller configured to execute the custom application to modify the behavior of the target device.

20 Claims, 9 Drawing Sheets

(56) References Cited

U.S. PATENT DOCUMENTS

| | | | | |
|---|---|---|---|---|
| 2017/0351493 A1* | 12/2017 | Kintali | ...................... | G06F 8/20 |
| 2018/0005195 A1* | 1/2018 | Jacobson | ........... | G06Q 10/1095 |
| 2018/0013579 A1* | 1/2018 | Fairweather | .......... | H04L 41/022 |
| 2018/0088789 A1* | 3/2018 | Han | .................... | G06F 3/04842 |
| 2018/0299840 A1* | 10/2018 | Sinha | ................... | G05B 13/048 |

* cited by examiner

BUILDING MANAGEMENT SYSTEM WITH GRAPHICAL PROGRAMMING TOOL

CROSS-REFERENCE TO RELATED PATENT APPLICATIONS

This application claims the benefit of and the priority to U.S. Provisional Patent Application No. 62/490,374 filed Apr. 26, 2017, the entire disclosure of which is incorporated by reference herein.

BACKGROUND

The present disclosure relates generally to a building management system (BMS) and more particularly to a BMS with a graphical programming tool. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Some buildings have unique operational requirements that mandate non-standard behavior for equipment of the BMS. Conventional BMSs have attempted to address this requirement using several different approaches. One approach is to customize the operational behavior of a standard product. Another approach is to attempt locating a device that can perform the unique requirements. Yet another approach is creating a custom solution that can be initiated either via a standard product add-on or the creation of a new device. In some instances, negotiations with the building owner can be utilized to modify or allow alternate behavior. However, all of these approaches require additional time and cost.

SUMMARY

One implementation of the present disclosure is a building management system (BMS). The BMS includes a graphical programming tool and a target device. The graphical tool includes a user interface generator configured to provide a user interface that allows a user to create a block design comprising a plurality of logical, mathematical, and functional object. The target device includes a block generator configured to receive a text file of the block design, convert the text file into an application block file, and assemble the application block file into a custom application for the target device. The target device further includes a device controller configured to execute the custom application to modify the behavior of the target device.

Another implementation of the present disclosure is a method for executing a custom application of a BMS. The method includes providing, by a user interface generator of a programming tool, a user interface that allows a user to create a block design comprising a plurality of logical, mathematical, and functional objects and interconnections therebetween. The method further includes receiving, by a block generator of a target device, a text file of the block design. The method further includes converting, by the block generator, the text file into an application block file. The method further includes assembling, by the block generator, the application block file into a custom application for the target device. The method further includes executing, by a device controller of the target device, the custom application to modify the behavior of the target device.

Another implementation of the present disclosure is a BMS controller. The BMS controller includes a target device. The target device includes a block generator configured to receive a text file from a graphical programming tool of the building management system controller, convert the text file into an application block file, and assemble the application block file into a custom application for the target device. The BMS controller further includes a device controller configured to execute the custom application to modify the behavior of the target device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a building management system (BMS) with a graphical programming tool and components thereof are shown, according to various exemplary embodiments. The graphical programming tool can be used to develop custom device logic (e.g., custom control applications, custom configurations settings, etc.) for one or more devices of the BMS. In some embodiments, the graphical programming tool generates a graphical user interface which can be presented via a user device. The graphical user interface may provide a user with a work surface onto which logical and mathematical objects (i.e., components) can be placed and positioned. The visual representation of these components can be interconnected using a mouse to create a graphical block design.

When the user has finished assembling the components and the graphical block design is complete, the graphical programming tool can convert the graphical block design into a text file (e.g., a JSON file, a XML file, etc.). The text file can be exported to a target device of the BMS (e.g., a controller, a HVAC device, an access control device, etc.). Once the target device receives the text file, it can assemble the components into an executable application by making the same interconnections made in the graphical block design. However, the target device may operate on actual software components rather than a visual representation of functional blocks. Once the application has been assembled, the target device can execute the application to augment or change the behavior of the target device. These and other features of the BMS and graphical programming tool are described in detail below.

Building HVAC Systems and Building Management Systems

Figure 1:
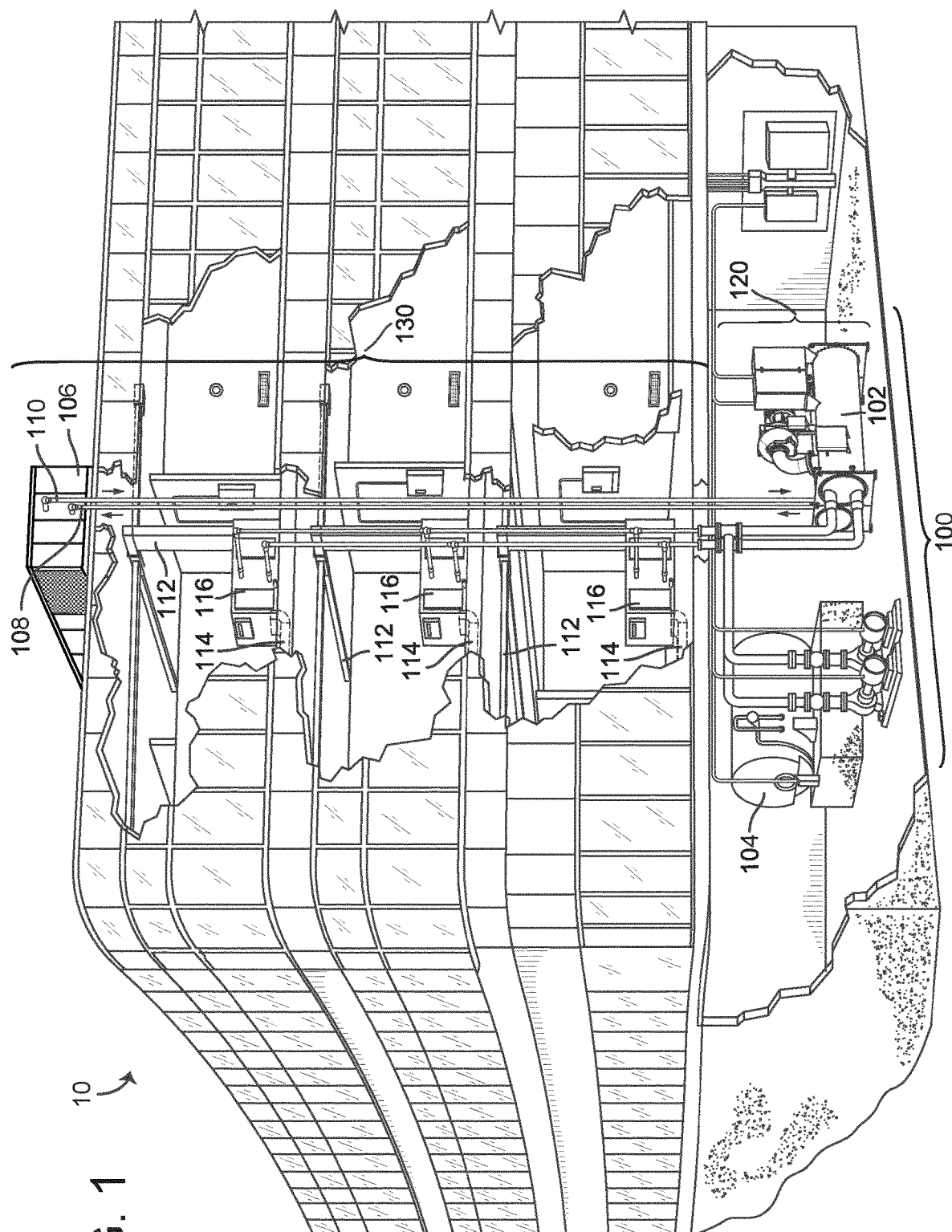
FIG. 1 is a drawing of a building equipped with a building management system (BMS) and a HVAC system, according to some embodiments.
Figure 2:
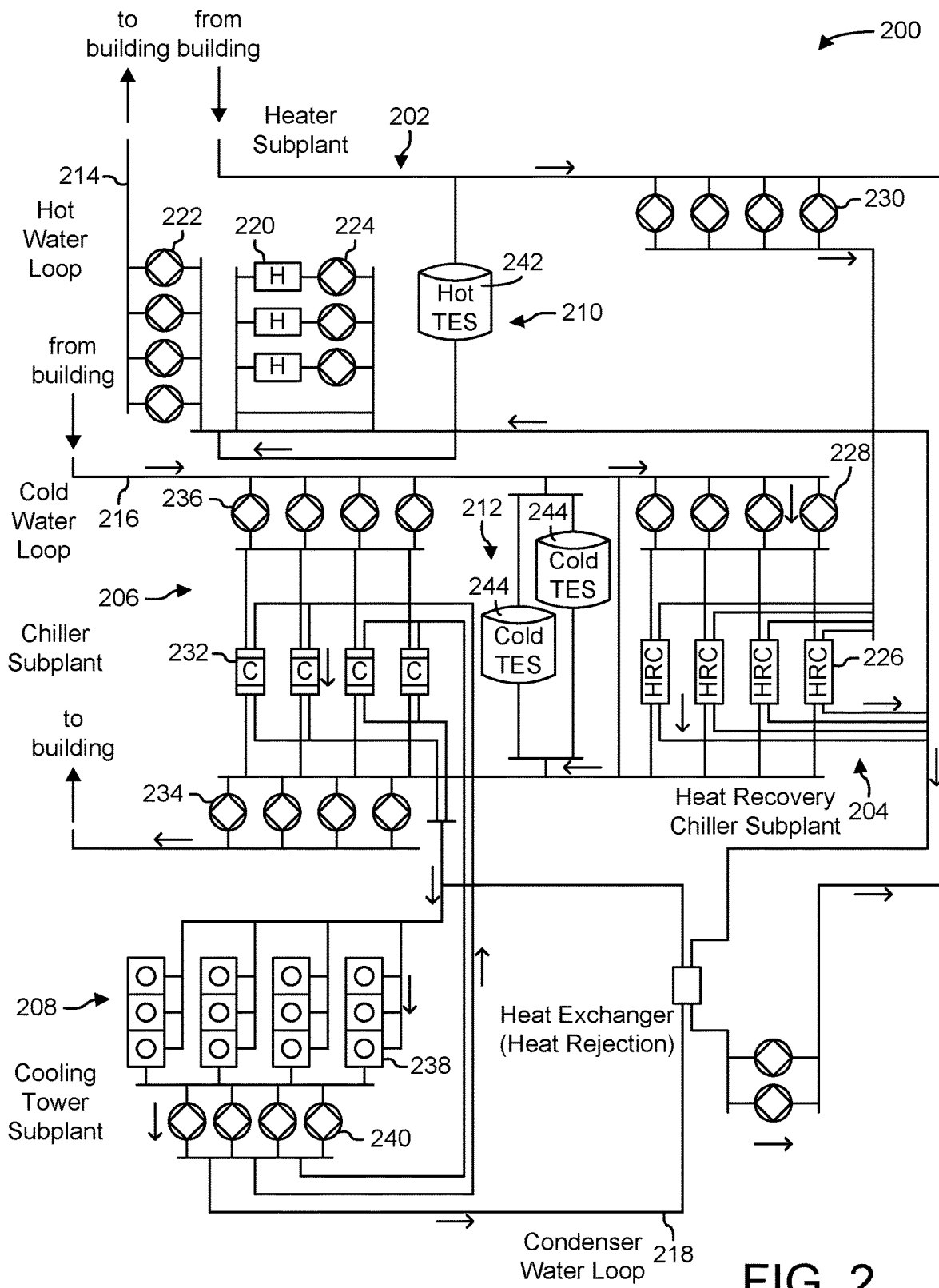
FIG. 2 is a schematic of a waterside system which can be used as part of the HVAC system of FIG. 1, according to some embodiments.
Figure 3:
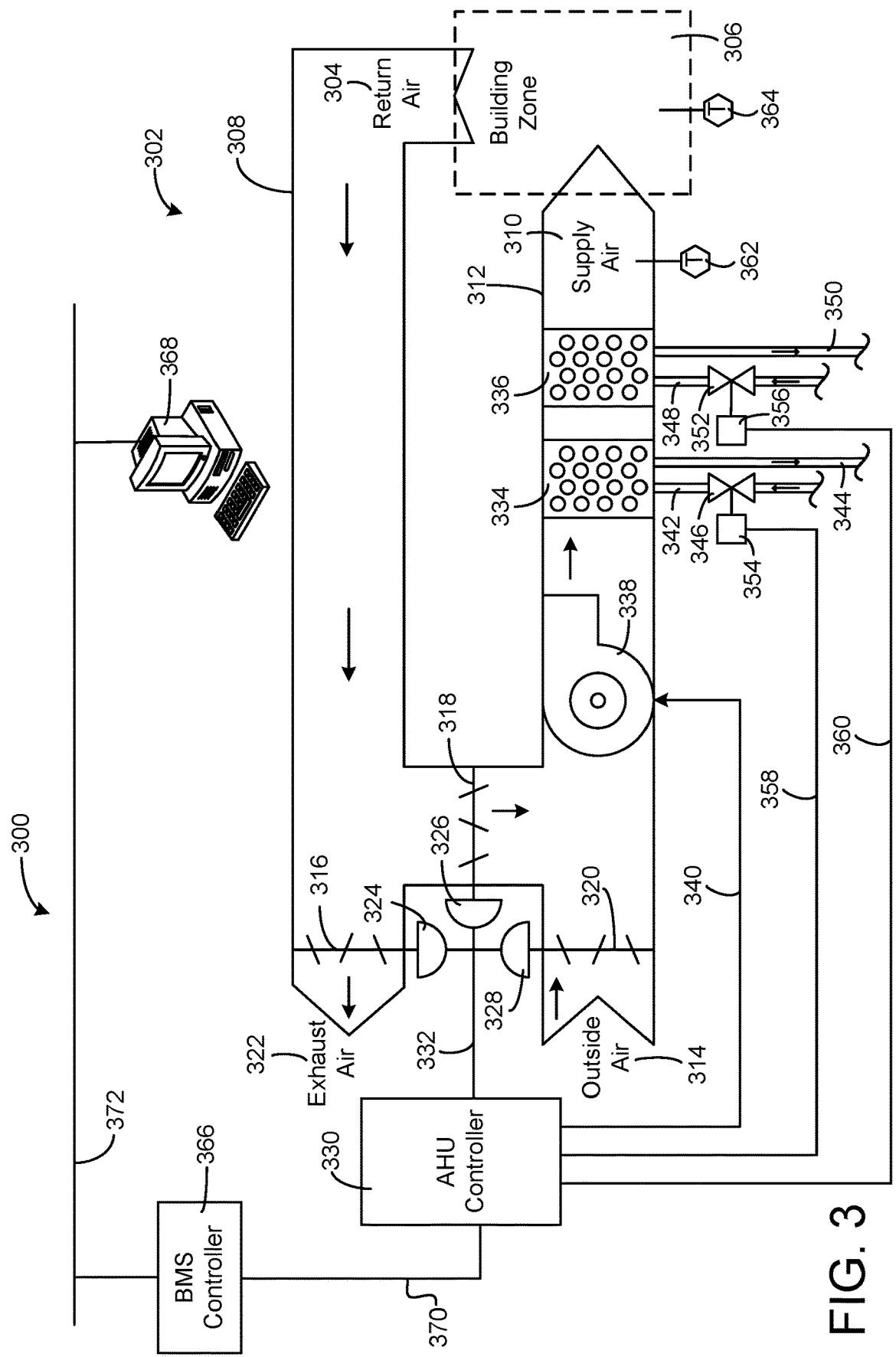
FIG. 3 is a block diagram of an airside system which can be used as part of the HVAC system of FIG. 1, according to some embodiments.
Figure 4:
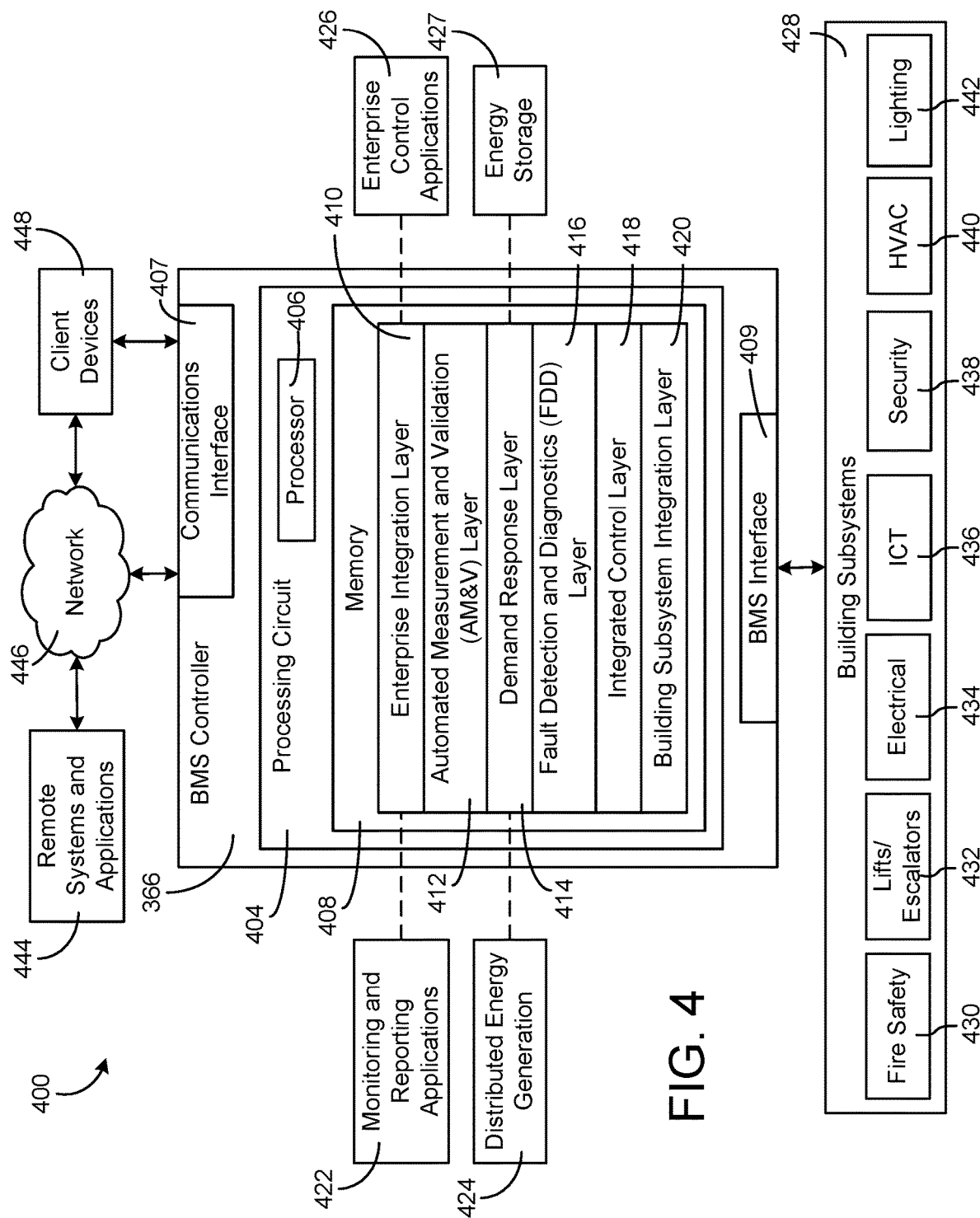
FIG. 4 is a block diagram of a BMS which can be used in the building of FIG. 1, according to some embodiments.
Figure 5:
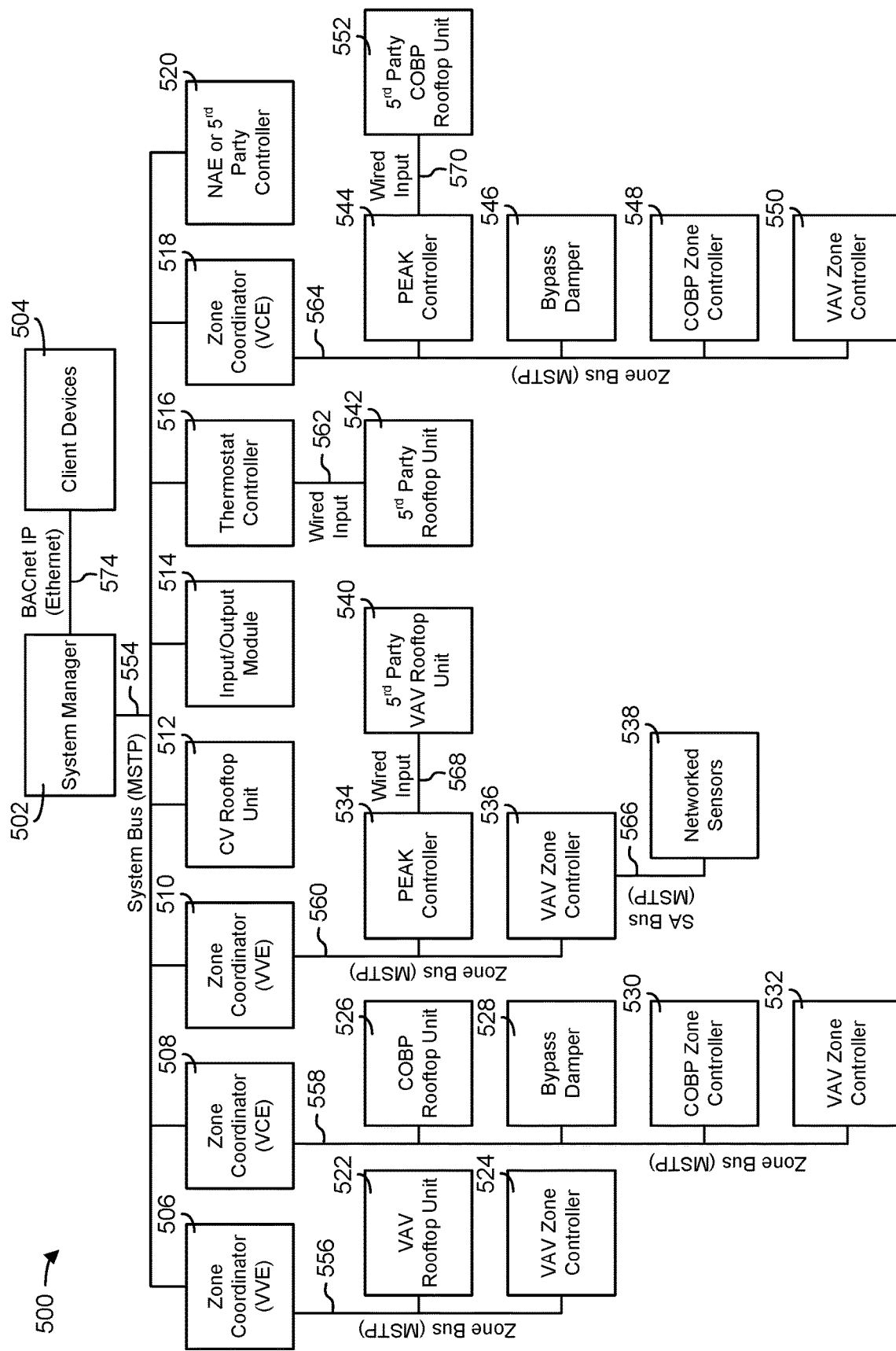
FIG. 5 is a block diagram of another BMS which can be used in the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Access Control System

Figure 6:
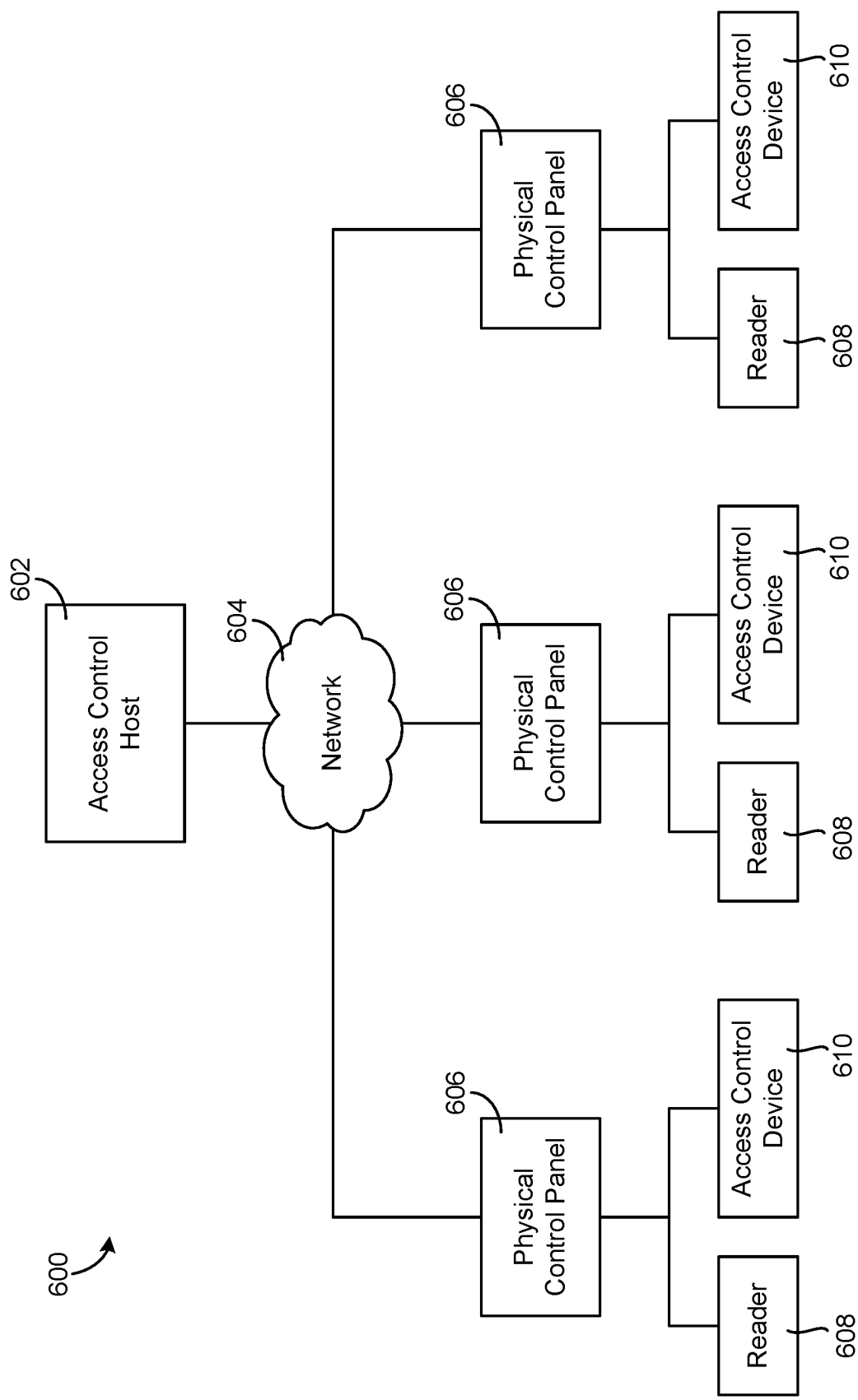
FIG. 6 is a block diagram of an access control system which can be used in the building of FIG. 1, according to some embodiments.

Referring now to FIG. 6, a block diagram of an access control system 600 is shown, according to some embodiments. In some embodiments, access control system 600 is a type of building subsystem 428 which can be implemented in building 10. Access control system 600 is configured to monitor and control access to various locations in or around a building (e.g., rooms or zones in a building, parking structures, etc.) using a collection of access control points. Each access control point is shown to include a physical control panel 606, a reader 608, and an access control device 610. Physical control panes 606 can be connected to readers 608 and access control devices 610 via a hardwired serial connection (e.g., RS-485 serial communication lines).

Readers 608 can include proximity card readers, biometric readers, keypads, or other input device configured to receive a credential from a user (e.g., by reading an access badge, receiving a PIN, scanning a fingerprint, etc.). Readers 608 can receive input from a user or a security device possessed by the user. For example, readers 608 can be configured to read a smartcard (e.g., in integrated circuit card) possessed by a user to automatically obtain a smartcard ID from the smart card. As another example, readers 608 can be configured receive an access code via a keypad or receive an electronic security token via wireless communications (e.g., NFC, Bluetooth, etc.) with a nearby user device (e.g., a smartphone, a tablet, etc.).

Access control devices 610 can include electronic locks, actuators, or other controllable devices that can be operated to automatically grant or deny access through the access control points. For example, a door access control point can include an electronic lock configured to lock and unlock the door in response to a control signal from the physical control panel. In some embodiments, access control devices 610 are distributed throughout a building or campus (i.e., a group of buildings). Each access control device 610 can be configured to control a particular access point (e.g., a doorway, a parking structure, a building entrance or exit, etc.).

User interactions with readers 608 (i.e., access requests) can be recorded as events and sent to access control host 602 via a communications network 604 (e.g., a TCP/IP network, a building automation and control network, a LAN, a WAN, etc.). Each event may include, for example, a timestamp, a device ID identifying the access control device 610, a security credential provided by the user at the access point (e.g., a smartcard ID, an access code, etc.), a user ID, and/or any other information describing the access request. Access control host 602 can process the events and determine whether to allow or deny the access request. In some embodiments, access control host 602 accesses a security database to determine whether the security credential provided by the user matches a stored security credential. In some embodiments, access control host 602 determines whether the user associated with the access request (e.g., defined by the user ID or smartcard ID) is authorized to access the area controlled by the access control device 610. In some embodiments, access control host 602 displays an alarm or prompt for a security workstation (e.g., a computer operated by security personnel) to allow or deny the access request.

Graphical Programming Tool

Figure 7:
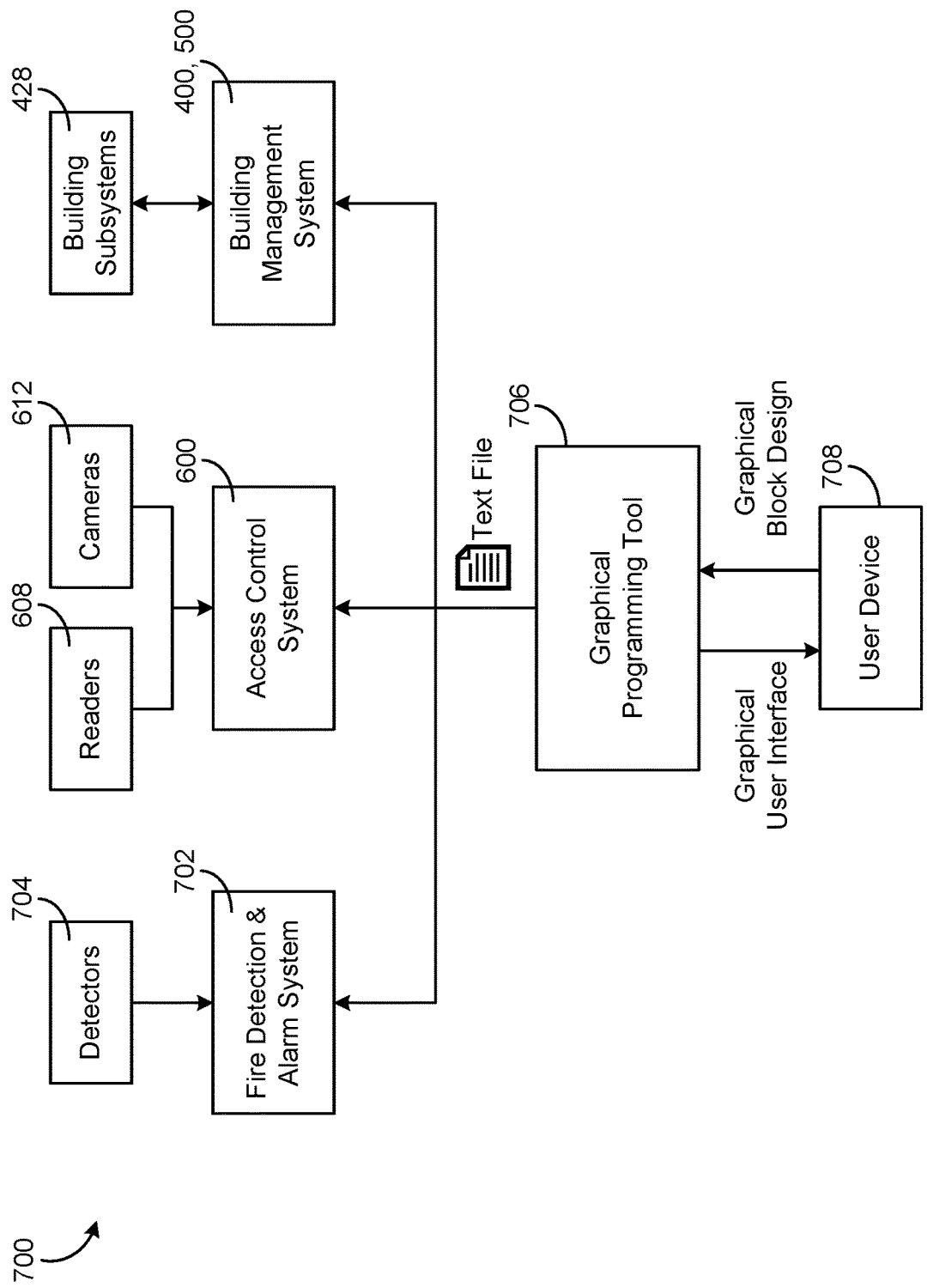
FIG. 7 is a block diagram of another BMS with a graphical programming tool, according to some embodiments.

Referring now to FIG. 7, a block diagram of a building management system (BMS) 700 with a graphical programming tool 706 is shown, according to an exemplary embodiment. BMS 700 can include some or all of the components of BMS 400, BMS 500, and/or access control system 600, as described with reference to FIGS. 4-6. For example, BMS 700 is shown to include building subsystems 428, readers 608 and cameras 612. Building subsystems 428 can be monitored and controlled by BMS 400 and/or BMS 500. Readers 608 and cameras 612 may provide input to access control system 600. BMS 700 is also shown to include a fire detection and alarm system 702 which can receive input from fire detectors 704.

BMS 700 is shown to include a graphical programming tool 706. Graphical programming tool 706 can be used to develop custom device logic (e.g., custom control applications, custom configurations settings, etc.) for one or more devices of BMS 700. In some embodiments, graphical programming tool 706 generates a graphical user interface which can be presented via a user device 708. The graphical user interface may provide a user with a work surface onto which logical, mathematical, and functional objects (i.e., components) can be placed and positioned. The visual representation of these components can be interconnected using a mouse to create a graphical block design.

When the user has finished assembling the components and the graphical block design is complete, graphical programming tool 706 can convert the graphical block design into a text file (e.g., a JSON file, a XML file, etc.). The text file can be exported to a target device of BMS 700 (e.g., a controller, a HVAC device, an access control device, etc.). Once the target device receives the text file, it can assemble the components into an executable application by making the same interconnections made in the graphical block design. However, the target device may operate on actual software components rather than a visual representation of functional blocks. Once the application has been assembled, the target device can execute the application to augment or change the behavior of the target device.

Figure 8:
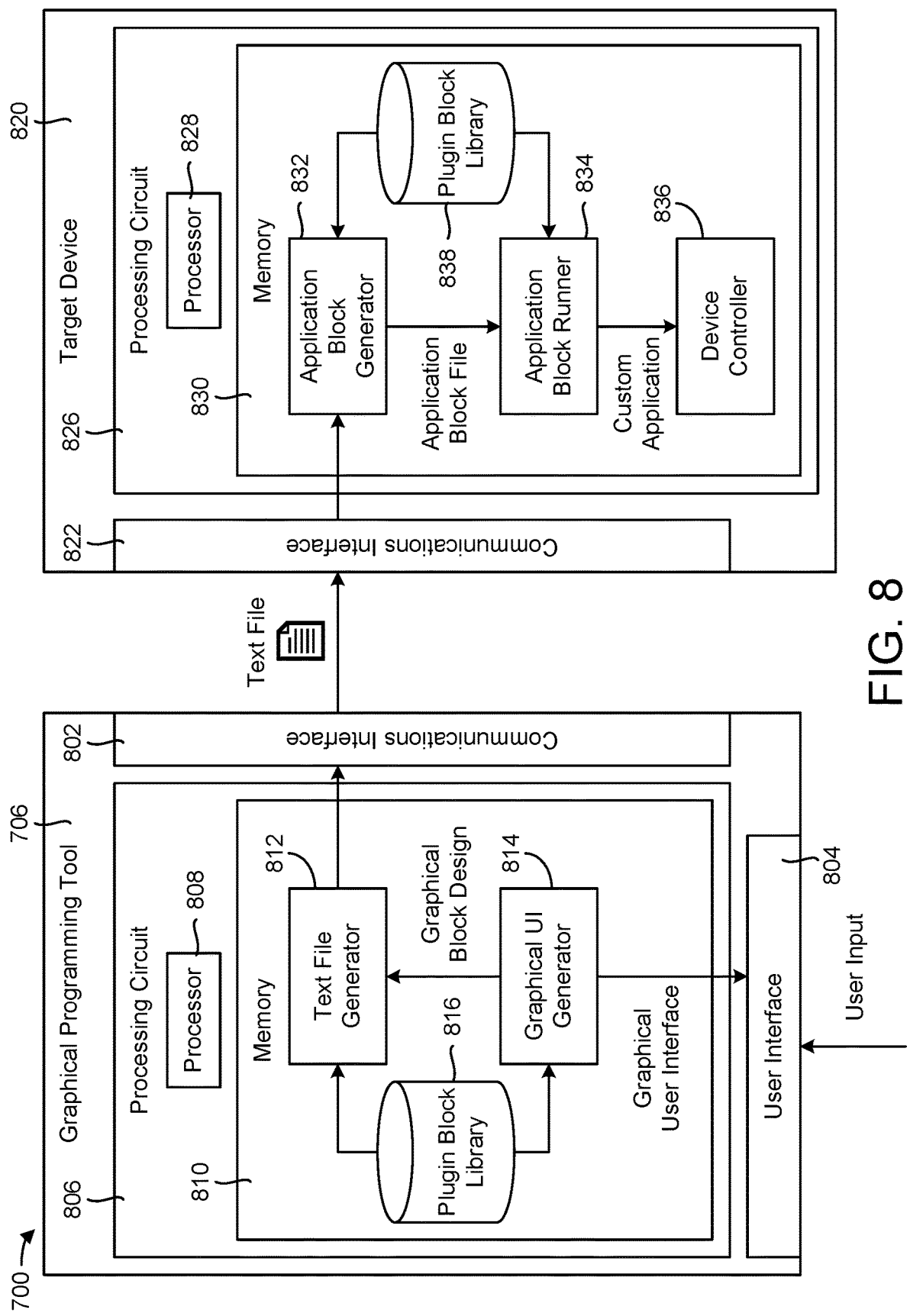
FIG. 8 is a block diagram illustrating a portion of the BMS of FIG. 7 in greater detail, according to some embodiments.

Referring now to FIG. 8, a block diagram illustrating a portion of BMS 700 in greater detail is shown, according to an exemplary embodiment. BMS 700 is shown to include graphical programming tool 706 and target device 820. Graphical programming tool 706 is shown to include a communications interface 802, a user interface 804, and a processing circuit 806. User interface 804 can include various devices configured to receive input from a user. For example, user interface 804 can include a touch-sensitive panel, capacitive or resistive touch buttons, physical buttons, switches, dials, etc. In some embodiments, the sensors also function as user input devices. For example, user input can be received via the microphone, camera, IMU, or other sensor devices of graphical programming tool 706.

Communications interface 802 can include wired or wireless interfaces (e.g., jacks, antennas, transmitters, receivers, transceivers, wire terminals, etc.) for conducting data communications with various systems, devices, or networks. Communications interface 802 can be configured to communicate via local area networks (e.g., a building LAN), wide area networks (e.g., the Internet, a cellular network, etc.), and/or conduct direct communications (e.g., NFC, Bluetooth, etc.). Communications interface 802 can include one or more wireless transceivers (e.g., a WiFi transceiver, a Bluetooth transceiver, a NFC transceiver, a cellular transceiver, etc.) to allow graphical programming tool 706 to operate as a mobile device.

Processing circuit 806 is shown to include a processor 808 and memory 810. Processor 808 can be a general purpose or specific purpose processor, an application specific integrated circuit (ASIC), one or more field programmable gate arrays (FPGAs), a group of processing components, or other suitable processing components. Processor 808 is configured to execute computer code or instructions stored in memory or received from other computer readable media (e.g., CDROM, network storage, a remote server, etc.).

Memory 810 can include one or more devices (e.g., memory units, memory devices, storage devices, etc.) for storing data and/or computer code for completing and/or facilitating the various processes described in the present disclosure. Memory 810 can include random access memory (RAM), read-only memory (ROM), hard drive storage, temporary storage, non-volatile memory, flash memory, optical memory, or any other suitable memory for storing software objects and/or computer instructions. Memory 810 can include database components, object code components, script components, or any other type of information structure for supporting the various activities and information structures described in the present disclosure. Memory 810 can be communicably connected to processor 808 via processing circuit 806 and can include computer code for executing (e.g., by processor 808) one or more processes described herein. When processor 808 executes instructions stored in memory 810, processor 808 generally configures graphical programming tool 706 (and more particularly processing circuit 806) to complete such activities.

Memory 810 is shown to include a graphical user interface (UI) generator 814, a text file generator 812, and a plugin block library 816. Graphical UI generator 814 can be configured to generate a graphical user interface that allows which can be presented via user interface 804 and/or via user device 708. The graphical user interface may provide a user with a work surface onto which logical and mathematical objects (i.e., components) can be placed and positioned. The visual representation of these components can be interconnected using a mouse to create a graphical block design. Each object or block of the graphical block design may define a functional block with corresponding mathematical functions or logical operations. The inputs and outputs of each object can be defined by the user by drawing connections between objects in the graphical user interface. Graphical UI generator 814 can be configured to output the graphical block design to text file generator 812.

Text file generator 812 can be configured to convert the graphical block design into a text file. In some embodiments, graphical UI generator 814 and/or text file generator 812 use one or more application-specific blocks stored in plugin block library 816 to create the graphical block design and/or the text file. The text file may include a JSON file, a XML file, a TXT file, or any other file that contains information in a textual format. Text file generator 812 can export the text file to target device 820 via communications interface 802. Target device 820 can include any device of BMS 700. For example, target device 820 may be a HVAC controller, a device controller, an access control panel, a lighting controller, a HVAC device (e.g., a chiller, an air handling unit, etc.), an access control device (e.g., an electronic lock), a lighting device, or any other device in BMS 700.

Target device 820 is shown to include a communications interface 822 and a processing circuit 826. Communications interface 822 can include wired or wireless interfaces (e.g., jacks, antennas, transmitters, receivers, transceivers, wire terminals, etc.) for conducting data communications with various systems, devices, or networks. Communications interface 822 can be configured to communicate via local area networks (e.g., a building LAN), wide area networks (e.g., the Internet, a cellular network, etc.), and/or conduct direct communications (e.g., NFC, Bluetooth, etc.). Communications interface 822 can include one or more wireless transceivers (e.g., a WiFi transceiver, a Bluetooth transceiver, a NFC transceiver, a cellular transceiver, etc.) to allow target device 820 to operate as a mobile device.

Processing circuit 826 is shown to include a processor 828 and memory 830. Processor 828 can be a general purpose or specific purpose processor, an application specific integrated circuit (ASIC), one or more field programmable gate arrays (FPGAs), a group of processing components, or other suitable processing components. Processor 828 is configured to execute computer code or instructions stored in memory or received from other computer readable media (e.g., CDROM, network storage, a remote server, etc.).

Memory 830 can include one or more devices (e.g., memory units, memory devices, storage devices, etc.) for storing data and/or computer code for completing and/or facilitating the various processes described in the present disclosure. Memory 830 can include random access memory (RAM), read-only memory (ROM), hard drive storage, temporary storage, non-volatile memory, flash memory, optical memory, or any other suitable memory for storing software objects and/or computer instructions. Memory 830 can include database components, object code components, script components, or any other type of information structure for supporting the various activities and information structures described in the present disclosure. Memory 830 can be communicatively connected to processor 828 via processing circuit 826 and can include computer code for executing (e.g., by processor 828) one or more processes described herein. When processor 828 executes instructions stored in memory 830, processor 828 generally configures target device 820 (and more particularly processing circuit 826) to complete such activities.

Memory 830 is shown to include an application block generator 832, an application block runner 834, a device controller 836, and a plugin block library 838. Application block generator 832 can be configured to receive the text file from graphical programming tool 706 and convert the text file into an application block file. Application block runner 834 can be configured to run the application block file to assemble a custom application for device controller 836. Application block runner 834 may assemble the application by making the same interconnections made in the graphical block design. However, application block runner 834 may operate on actual software components rather than a visual representation of functional blocks. Once the application has been assembled, device controller 836 can execute the application to augment or change the behavior of target device 820.

Advantageously, graphical programming tool 706 and the resulting textual document (i.e., the text file) can be consumed and executed on a variety of devices, regardless of the operating system of the target device 820. Target device 820 can be most any size, version, or type of device (e.g., HVAC, security, lighting, etc.). The operations performed by graphical programming tool 706 and target device 820 may facilitate developing custom device applications. The custom device applications can be used to transform an off-the-shelf target device into a device that has customized programming or logic to meet customer-specific requirements.

One example of a custom device application can be implemented in a diamond mine that requires miners to exit the mine via a man-trap. The custom device application may randomly select miners to be searched and x-rayed to insure no diamond were stolen. Another example of a custom device application can be used to control occupant access via a security card reader and the attending behavior of the occupied space and its security. Yet another example of a custom device application can be used in a hospital setting to ensure that each patient's room conditions (e.g., lighting, temperature, scenery, music, etc.) would match their personal preferences.

Figure 9:
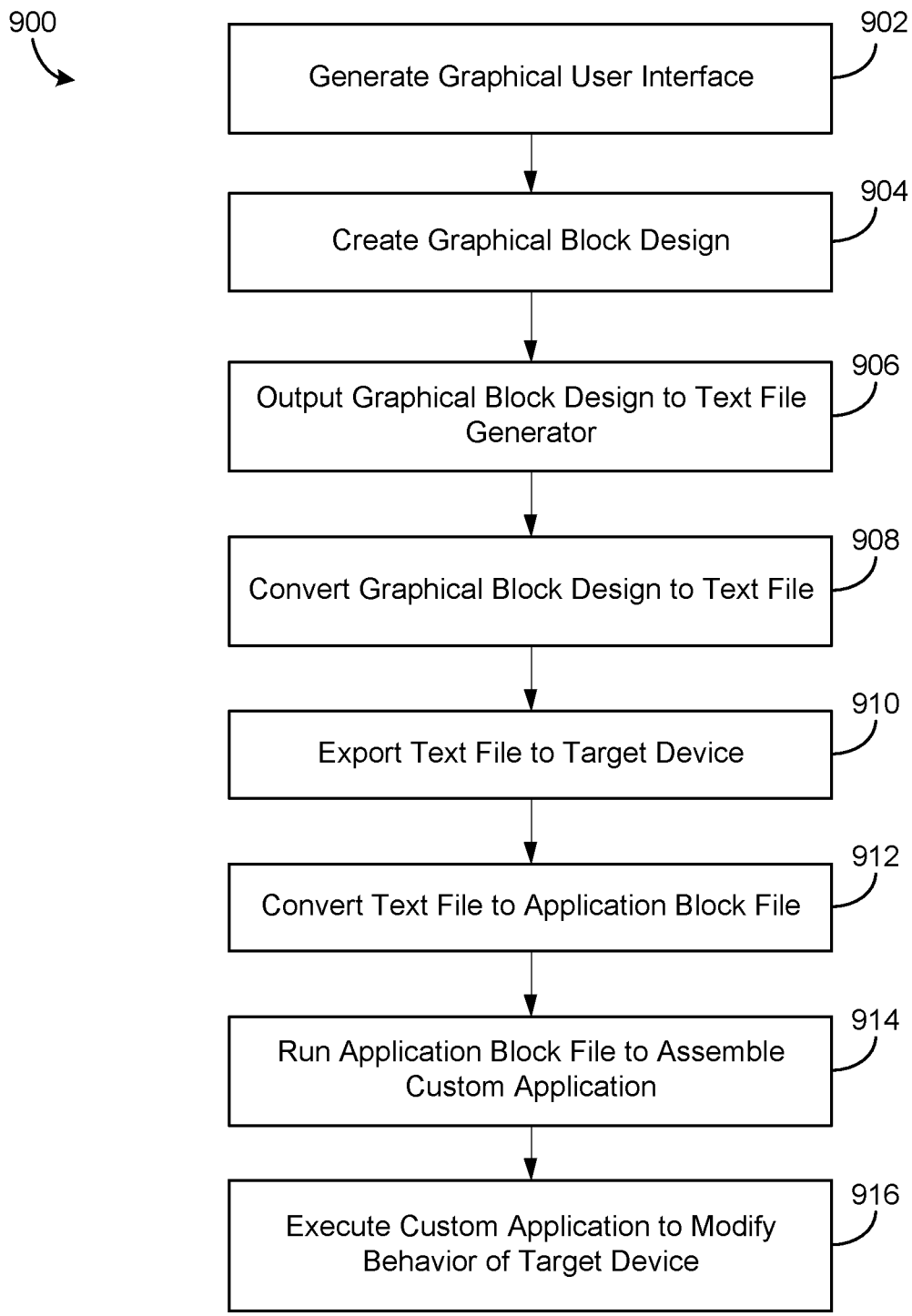
FIG. 9 is a flow diagram illustrating a process for creating and executing a custom application of the BMS, according to some embodiments.

Referring now to FIG. 9, a flow diagram illustrating a process 900 for creating and executing a custom application of the BMS is shown, according to some embodiments. At process block 902, a graphical user interface is generated. In one embodiment, a graphical programming tool, such as graphical programming tool 706 may generate the graphical user interface. The graphical user interface may provide a user with a work surface onto which logical, mathematical, and functional components can be placed and positioned.

At process block 904, a graphical block design is created. In one embodiment, the graphical block design is created via the graphical user interface. The graphical user interface may provide a user with a work surface having a visual representation of components that can be interconnected using a mouse to create the graphical block design. The graphical block design may be created by a user rearranging the logical, mathematical, and functional components portrayed on the graphical user interface.

At process block 906, the graphical block design is output to a text file generator. In one embodiment, a graphical programming tool, such as graphical programming tool 706, may be configured to output the graphical block design to the text file generator. In the embodiment shown in FIG. 8, the text file generator 812 is a part of the memory 810 of the graphical programming tool 706. In other embodiment, the text file generator may comprise a separate device than the graphical programming tool.

At process block 908, the graphical block design is converted to a text file. In one embodiment, a graphical programming tool, such as graphical programming tool 706, may convert the graphical block design into a text file In some embodiments, the text file may comprise a JSON file, a XML file, a TXT file, or any other file that contains information in a textual format.

At process block 910, the text file is exported to a target device of the BMS 700. In one embodiment, the text file is exported via a graphical programming tool, such as graphical programming tool 706. The text file may be exported to the target device from the graphical programming tool 706 via communications interface 822. The target device can include any device of the BMS, such as target device 820. In some embodiments, the target device may comprise a controller, an HVAC device (e.g., a chiller, an air handling unit, etc.), or an access control device (e.g., an electronic lock). In one embodiment, the target device may be target device 820.

At process block 912, the target device converts the text file into an application block file. In some embodiments, the target device may assemble the components (e.g., logical, mathematical, functional objects, etc.) by making the same interconnections as made in the graphical block design. In other embodiments, the target device may operate on software components rather than a visual representation of the logical, mathematical, and functional objects.

At process block 914, the target device runs the application block file to assemble a custom application. In some embodiments, the target device may assembly the custom application via an application block runner, such as application block runner 834. In one embodiment, application block runner 834 may assemble the custom application by making the same interconnections made in the graphical block design.

At process block 916, the target device executes the custom application to modify the behavior of the target device. In some embodiments, the custom application may be executed via an application block runner, such as application block runner 834. In one embodiment, the device controller 836 may execute the custom application to modify the behavior of target device 820. The behavior of the target device that may be modified includes various settings (e.g., lighting, temperature, music, etc.).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system, the building management system comprising:
    a programming tool comprising:
        a user interface generator configured to provide a user interface that allows a user to create a block design comprising a plurality of logical, mathematical, and functional objects; and
    a target device comprising:
        a block generator configured to receive a text file of the block design, convert the text file into an application block file, and assemble the application block file into a custom application for the target device; and
        a device controller configured to execute the custom application to modify behavior of the target device.

2. The building management system of claim 1, wherein the programming tool further comprises a text file generator configured to convert the block design into the text file and export the text file to the target device.

3. The building management system of claim 1, wherein the user interface further allows the user to create a plurality of interconnections between the logical, mathematical, and functional objects such that the interconnections between the logical, mathematical, and functional objects creates the block design as a graphical block design.

4. The building management system of claim 3, wherein the target device further comprises an application block runner configured to assemble the application block file into the custom application.

5. The building management system of claim 4, wherein the application block runner assembles the application block file by making the interconnections of the graphical block design.

6. The building management system of claim 4, wherein the application block runner is configured to operate on a plurality of software components.

7. The building management system of claim 1, wherein the text file is created by an additional device of the building management system.

8. A method for executing a custom application of a building management system, the method comprising:
    providing, by a user interface generator of a programming tool, a user interface that allows a user to create a block design comprising a plurality of logical, mathematical, and functional objects and interconnections therebetween;
    receiving, by a block generator of a target device, a text file of the block design;
    converting, by the block generator, the text file into an application block file;
    assembling, by the target device, the application block file into a custom application for the target device; and
    executing, by a device controller of the target device, the custom application to modify behavior of the target device.

9. The method of claim 8, further comprising:
    converting, by a text file generator of the programming tool, the block design into the text file; and
    exporting, by the text file generator, the text file to the block generator of the target device.

10. The method of claim 8, wherein the user interface further allows the user to create a plurality of interconnections between the logical, mathematical, and functional objects such that the interconnections between the logical, mathematical, and functional objects creates the block design.

11. The method of claim 10, wherein the target device further comprises an application block runner configured to assemble the application block file into the custom application.

12. The method of claim 11, further comprising assembling, by the application block runner, the application block file by making the interconnections of the block design.

13. The method of claim 11, further comprising operating the application block runner on a plurality of software components.

14. The method of claim 8, further comprising creating, by an additional device of the building management system, the text file.

15. A building management system controller comprising:
    a target device comprising:
        a block generator configured to receive a text file from a graphical programming tool of the building management system controller, convert the text file into an application block file, and assemble the application block file into a custom application for the target device; and
        a device controller configured to execute the custom application to modify behavior of the target device.

16. The building management system controller of claim 15, further comprising a programming tool, the programming tool comprising:

a user interface generator configured to provide the user interface that allows a user to create a block design comprising a plurality of logical, mathematical, and functional objects.

17. The building management system controller of claim 16, wherein the programming tool further comprises a text file generator configured to convert the block design into the text file and export the text file to the target device.

18. The building management system controller of claim 16, wherein the user interface further allows a user to create a plurality of interconnections between the logical, mathematical, and functional objects such that the interconnections between the logical, mathematical, and functional objects creates a graphical block design.

19. The building management system controller of claim 18, wherein the target device further comprises an application block runner configured to assemble the application block file into the custom application.

20. The building management system controller of claim 18, wherein the application block runner assembles the application block file by making the interconnections of the graphical block design.

* * * * *